Oct. 7, 1958
C. F. SCHUNEMANN
2,855,525
SWITCHING SYSTEM
Filed Dec. 30, 1955
2 Sheets-Sheet 1
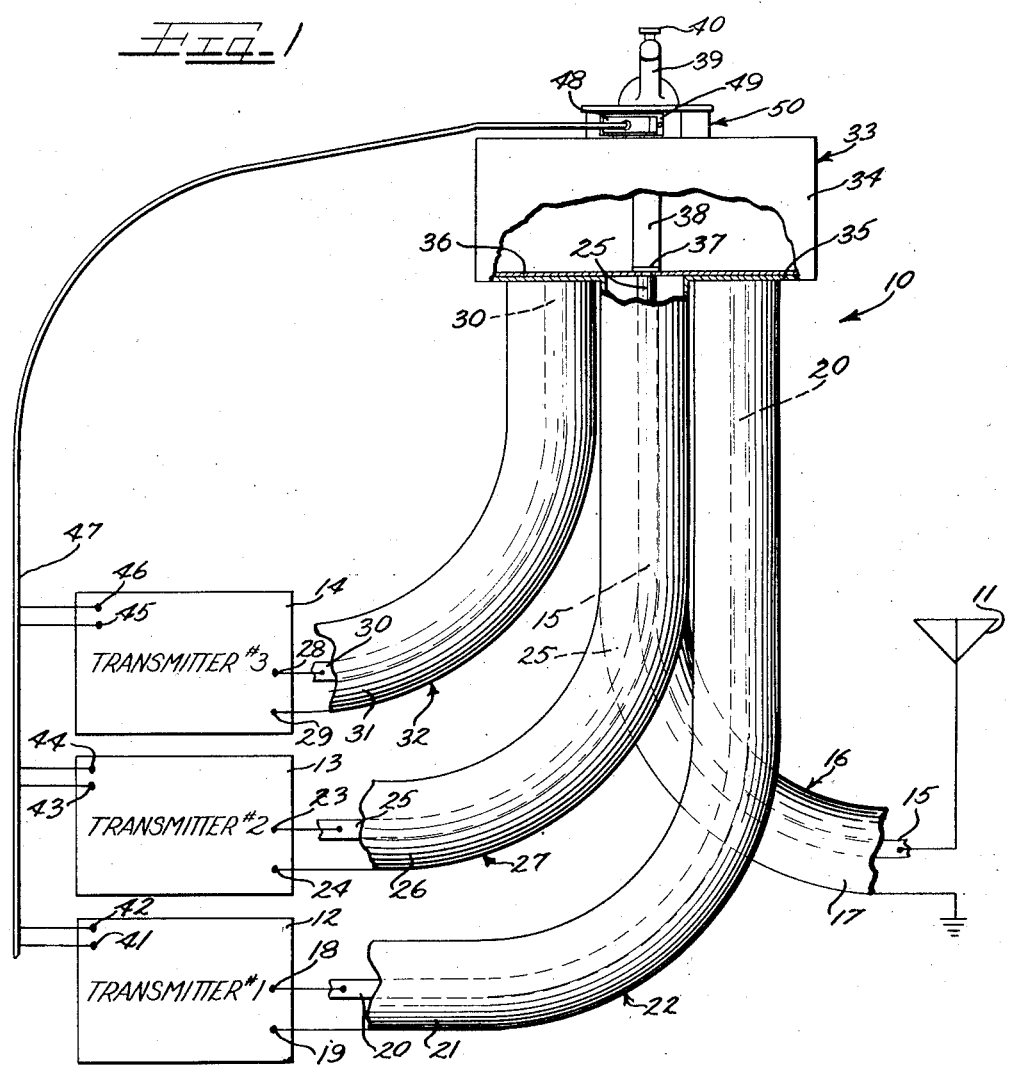
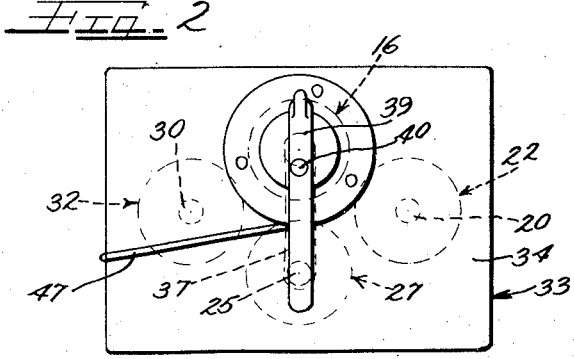
Inventor
CARL F. SCHUNEMANN Oct. 7, 1958  C. F. SCHUNEMANN  2,855,525
SWITCHING SYSTEM
Filed Dec. 30, 1955  2 Sheets-Sheet 2
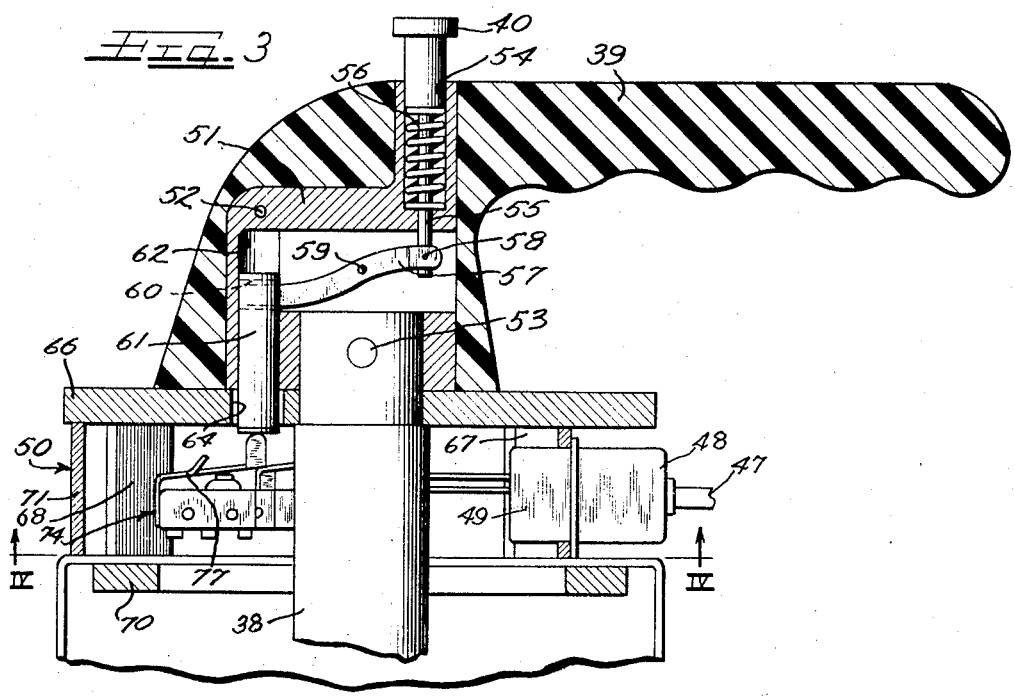
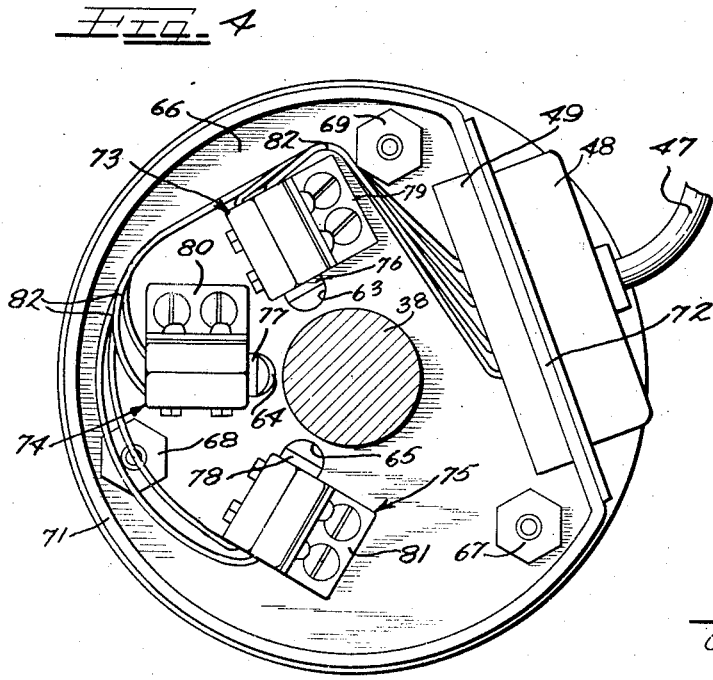
Inventor
CARL F. SCHUNEMANN

United States Patent Office 2,855,525
Patented Oct. 7, 1958

2,855,525

SWITCHING SYSTEM

Carl F. Schunemann, Euclid, Ohio, assignor to Thompson Products, Inc., Cleveland, Ohio, a corporation of Ohio Application December 30, 1955, Serial No. 556,646

4 Claims. (Cl. 307—94)

This invention relates to a switching system and more particularly to a transmission line switching system. One transmission line is coupled to any selected one of a plurality of other transmission lines.

In many transmission line switching systems, it is not possible to rapidly switch between the transmission lines with the result that no load is presented to the energy source or sources feeding the lines. This is particularly true in high frequency transmission line systems using coaxial lines or the like which are difficult to rapidly switch. In addition, if a high frequency transmission line is temporarily open circuited it will generally result in the production of standing waves and extremely high voltages at certain points in the transmission line which can cause breakdowns of insulation if any substantial amount of power is being transmitted. It is therefore highly desirable in such systems that the transmission of power in the transmission lines be interrupted during the switching operation.

In systems in which a load is selectively connected to a plurality of energy sources, it is also desirable that each energy source be activated only when it is connected to the load.

It is therefore an object of this invention to provide a switching system for transmission lines and especially lines operated at high frequencies in which the transmission of power in the lines is interrupted during the switching operation.

Another object of this invention is to provide a switching system for connecting a load to any selected one of a plurality of energy sources in which each source is activated only when it is connected to the load.

A further object of this invention is to provide a switch which is simple, compact, efficient and reliable in operation and which is constructed from a minimum number of parts readily and economically manufactured and assembled.

According to this invention, a switching system is provided including conductor means movable into a plurality of positions for selectively connecting one transmission line to a plurality of other transmission lines, and switch means are provided movable to an operative position for preventing transmission of energy through the lines with means for actuating said switch means to the operative position thereof during movement of the conductor means between such positions.

A feature of the invention is in the provision of a switch in which conductor means are selectively movable between first and second positions for selectively connecting a load to first and second energy sources with first and second switch means for respectively activating the first and second energy sources, and with means for actuating the first switch means only in the first position of the conductor means and actuating the second switch means only in the second position of the conductor means.

Another feature of the invention is in the provision of a switch including releasable detent means for locking the switch in each of a plurality of operative positions with switch means actuated by release of the detent means for preventing transmission of energy through the transmission lines interconnected by the switch system.

This invention contemplates other objects, features and advantages which will become more fully apparent from the following detailed description taken in conjunction with the accompanying drawings which illustrate a preferred embodiment and in which:

Figure 1 is a side elevational view of a transmission line switching system constructed according to this invention, certain elements being illustrated diagrammatically;

Figure 2 is a top plan view of the switch utilized in the system of Figure 1;

Figure 3 is a cross-sectional view taken substantially along line III—III of Figure 1; and Figure 4 is a cross-sectional view taken substantially along line IV—IV of Figure 3.

Reference numeral 10 generally designates a transmission line switching system constructed according to this invention. The system 10 is particularly designed to couple a load in the form of an antenna 11 to any selected one of a plurality of energy sources in the form of high frequency transmitters 12, 13 and 14 which may respectively be labeled "Transmitter No. 1," "Transmitter No. 2," and "Transmitter No. 3."

The antenna 11 is connected to the inner conductor 15 of a coaxial transmission line 16 having an outer conductor 17 connected to ground; the transmitter 12 has output terminals 18 and 19 respectively connected to inner and outer conductors 20 and 21 of a coaxial transmission line 22; the transmitter 13 has output terminals 23 and 24 respectively connected to inner and outer conductors 25 and 26 of a coaxial line 27; and the transmitter 14 has output terminals 28 and 29 respectively connected to inner and outer conductors 30 and 31 of a coaxial line 32.

The coaxial line 16 is selectively connected to the lines 22, 27 and 32 by a switch unit 33 which comprises a housing 34 including a bottom wall 35 having four openings of diameters approximately equal to the diameters of the outer conductors 17, 21, 26 and 31 with such outer conductors being mechanically and electrically connected to the bottom wall 35 about such openings. A sheet of insulating material 36 on the bottom wall 35 supports terminal end portions of the inner conductors, 15, 20, 25 and 30 and a switch blade 37 is disposed on the sheet 36 with one end thereof in engagement with the terminal end of the inner conductor 15 of the antenna line 16, the switch blade 37 being rotatable about the axis of the line 16 to selectively engage the other end thereof with the terminal ends of the inner conductors 20, 25 and 30, so as to selectively connect the line 16 to the lines 22, 27 and 32. With proper design of this switch arrangement, it is possible to obtain a very low voltage standing wave ratio.

For rotating the switch blade 37, it is coupled to the lower end of a vertical shaft 38 journalled in the unit 33 with an operating handle 39 secured to the upper end of the shaft 38. In the illustrated position of the switch, the switch blade 37 is in engagement with the inner conductor 25 so as to connect the line 27 to the line 16 with the No. 2 transmitter 13 being connected to the antenna 11. By rotating the handle 39 in a counter-clockwise direction through approximately 60°, as viewed in the top plan view of Figure 2, the switch blade 37 will be engaged with the end of the conductor 20 to connect the No. 1 transmitter 12 to the antenna 11, and by rotating the handle 39 in a clockwise direction through approximately 60° from the illustrated position, the switch blade 37 will engage the conductor 30 so that the No. 3 transmitter 14 will be connected to the antenna 11.

Detent means are provided for locking the switch in each of the three positions, such means being releasable by depression of a button 40 on the operating handle 39.

In accordance with this invention, terminals 41 and 42 are provided on the transmitter 12 with the circuit of the transmitter 12 being such that it is activated only when the terminals 41 and 42 are connected together. The transmitters 13 and 14 are provided with similar pairs of terminals 43, 44 and 45, 46. The terminals 41–46 are connected to conductors of a cable 47 which is connected to a plug 48 arranged to be plugged into a jack 49 of an interlock unit 50 disposed between the handle 39 and the upper wall of the housing 34. The interlock unit 50 is arranged to connect the terminals 41, 42 together only when the transmitter 12 is connected through the transmission lines 22 and 16 to the antenna 11; the terminals 43, 44 together only when the transmitter 13 is connected to the antenna; and the terminals 45, 46 together only when the transmitter 14 is connected to the antenna.

Referring now to Figures 3 and 4, an insert 51 is secured within the handle 39 by a screw 52 and is secured to the upper end of the shaft 38 by a pin 53. The button 40 is telescopingly movable in a bore 54 in the insert 51 and has a reduced diameter lower end portion 55 extending through a coiled compression spring 56 which serves to urge the button 40 upwardly.

The lower end of the portion 55 of the button 40 is received by the bifurcated end of a lever 57 and is pivotally secured thereto by a pin 58. The lever 57 is pivoted within the insert 51 on a pin 59 and the opposite end thereof is disposed in a slot 60 in a detent plunger 61 telescopingly movable in a vertical bore 62 of the insert 51. The compression spring 56 in urging the button 40 upwardly also serves through the lever 57 to urge the detent plunger 61 downwardly, and at the positions of the handle 39 in which the switch blade 37 contacts the ends of the inner coaxial line conductors 20, 25 and 30, the plunger 61 will move downwardly into notches in the form of holes 63, 64 and 65 in a plate 66 underlying the handle 39 and forming the top wall of the interlock unit 50. The switch blade 37 is thus locked in each of its operative positions and in order to move from one position to another, the button 40 must be depressed to move the plunger 61 upwardly. After a slight rotation of the handle, the button 40 may be released and the plunger will engage the top surface of the plate 66 until the handle is rotated to a position in which the plunger 61 can move downwardly into one of the holes 63, 64 or 65.

To support the plate 66 in spaced relation above the upper wall of the housing 34, the plate 66 is secured by screws to the upper ends of three upright posts 67, 68 and 69 of generally hexagonal cross-section which have integral pin-like projections at their lower ends extending downwardly through openings in the upper wall of the housing 34 with a press fit into a retaining ring 70. A member 71 is held between the plate 66 and the upper wall of the housing 34 to define a side wall for the interlock unit 50, the member 71 being circular except for a flat portion 72 on which the jack 49 is supported.

According to this invention, switch means are operated by the detent mechanism to prevent transmission of power except in the operative position of the transmission line switch. In particular, microswitches 73, 74 and 75 disposed within the interlock unit 50 have operating levers 76, 77 and 78 in alignment with the holes 63, 64 and 65, the levers being urged upwardly but being actuated downwardly by the detent plunger 61. Figure 3 illustrates the actuation of the lever 77 when the plunger 61 moves downwardly into the notch or hole 64. The microswitches 73, 74 and 75 are supported from the plate 66 by L-shaped brackets 79, 80 and 81 and are electrically connected through wires 82 to the jack 49 for connection through the cable 47 to the transmitters 12, 13 and 14. In the illustrated system, the microswitch 73 is connected between the terminals 41 and 42, the microswitch 74 is connected between the terminals 43 and 44 and the microswitch 75 is connected between the terminals 45 and 46. The microswitches are normally open and since the transmitters 12, 13 and 14 are activated only upon short-circuiting of the terminals 41—42, 43—44, and 45—46, each transmitter will be operated only when the switch is operative to connect the same to the antenna 11.

It will be appreciated that other types of switch circuits could be used. For example, if a single transmitter were connected to a plurality of antennas, the microswitches could be connected in parallel to the control terminals of the transmitter, so that the transmitter would be activated when, but only when, the switch is operated to connect the same to an antenna.

It will be noted that with the switch of this invention, the detent mechanism not only serves its locking function but also serves to actuate the interlock switch arrangement. It will also be noted that the arrangement is such that the transmitter must be deactivated prior to any movement of the switch blade.

It will be understood that modifications and variations may be effected without departing from the spirit and scope of the novel concepts of this invention.

I claim as my invention:

1. In a power transmission system including a load and first and second energy sources, a switch unit connected to said energy sources and said load, conductor means in said unit selectively movable between first and second positions for selectively connecting said load to said first and second energy sources, first and second switch means for respectively activating said first and second energy sources, and means actuating said first switch means only in said first position of said conductor means and actuating said second switch means only in said second position of said conductor means.

2. In a power transmission system including a load and first and second energy sources, a switch unit connected to said load and said energy sources, conductor means in said unit selectively movable between first and second positions for selectively connecting said load to said first and second energy sources, releasable detent means for locking said conductor means in each of said positions, first and second switch means for respectively activating said first and second energy sources, and means including said detent means for actuating said first switch means only in said first position of said conductor means and actuating said second switch means only in said second position of said conductor means.

3. In a switching system, conductor means movable into a plurality of positions for selectively connecting one transmission line to a plurality of other transmission lines, a detent connected to said conductor means, means defining a plurality of notches for receiving said detent to lock said conductor means in each of said positions, and means actuated upon movement of said detent out of said notches for preventing transmission of energy through said lines.

4. In a power transmission system including a load and first and second energy sources, a switch unit connected to said load and to said energy sources, conductor means in said unit selectively movable between first and second positions for selectively connecting said load to said first and second energy sources, a detent connected to said conductor means, means defining first and second notches for receiving said detent to lock said conductor means in said first and second positions, first switch means actuated by movement of said detent into said first notch for activating said first source, and second switch means actuated by movement of said detent into said second notch for activating said second source.

References Cited in the file of this patent

UNITED STATES PATENTS

| | | |
|---|---|---|
| 2,427,940 | Ayres | Sept. 23, 1947 |
| 2,443,389 | Hings | June 15, 1948 |
| 2,594,181 | Kliegl et al. | Apr. 22, 1952 |
| 2,629,048 | Dyke et al. | Feb. 17, 1953 |